Figure 1:
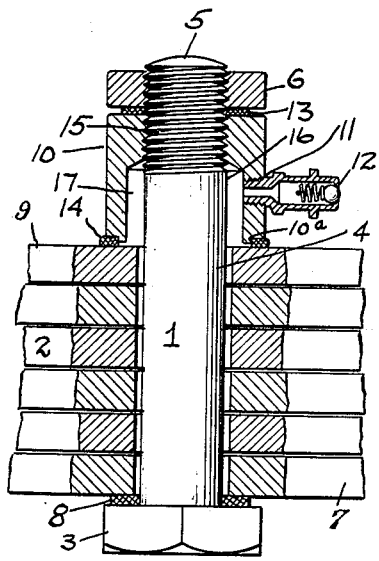

Feb. 9, 1926.

C. P. MURPHY 1,572,073

BOLT ADAPTER FOR LUBRICATING PURPOSES

Original Filed Sept. 25, 1922

INVENTOR.
Charles P. Murphy
BY
Fay, Oberlin & Fay
ATTORNEYS.

Patented Feb. 9, 1926.

1,572,073

UNITED STATES PATENT OFFICE.

CHARLES P. MURPHY, OF CLEVELAND, OHIO.

BOLT ADAPTER FOR LUBRICATING PURPOSES.

Original application filed September 25, 1922, Serial No. 590,246. Divided and this application filed August 13, 1925. Serial No. 50,106.

*To all whom it may concern:*

Be it known that I, CHARLES P. MURPHY, a citizen of the United States, and a resident of Cleveland, county of Cuyahoga, and State of Ohio, have invented a new and useful Improvement in Bolt Adapters for Lubricating Purposes, of which the following is a specification, the principle of the invention being herein explained and the best mode in which I have contemplated applying that principle, so as to distinguish it from other inventions.

This invention relates to a bolt adapter for lubricating purposes and is carved out of my copending application for United States Letters Patent, Serial No. 590,246, filed September 25, 1922, upon a bolt adapter for lubricating purposes. Said copending application discloses two specific forms of construction and the present application is limited to one of said forms. More particularly the present invention comprises means to be used in conjunction with the usual standard form of headed steel bolts to adapt the same to distribute lubrication to their adjacent parts.

The invention is particularly suited for use in connection with the center bolts for automobile springs, which may be thus adapted to serve as means for distributing lubrication to the spring leaves.

It has heretofore been attempted to provide for the lubrication of spring leaves through passageways adjacent the center bolts but in each such instance the structure of the parts has been greatly modified. For example, channel ways have been provided in the spring leaves and grooves and tubular passageways have been formed in the nut or upon the surface of the bolt, and the use of numerous auxiliary parts for carrying the lubrication has been necessary. Such special constructions are expensive to manufacture and install and in many instances the spring structure itself is greatly weakened.

It is the object of my invention to avoid the necessity of using special forms of spring leaves, or center bolts, or nuts therefor, and to adapt the usual standard forms of springs and center fastening bolts and nuts to adequately serve as means for the distribution of lubricant, particularly in connection with lubricating systems wherein a pressure grease gun is used. This is made possible by the fact that spring leaves of standard type are slightly concave on their upper and lower surfaces and by the further fact that the holes through the centers of the spring leaves are slightly larger than the standard center bolts used to hold such leaves assembled. Thus there is a passageway for grease formed between each pair of spring leaves and a like passageway for grease to flow into such first named passageways along the outer surface of the standard spring bolt. To the accomplishment of the foregoing and related ends, said invention, then, consists of the means hereinafter fully described and particularly pointed out in the claims.

The annexed drawings and the following description set forth in detail certain structure embodying the invention, such disclosed means constituting, however, but one of various mechanical forms in which the principle of the invention may be used.

In said annexed drawings:—

Figure 2:
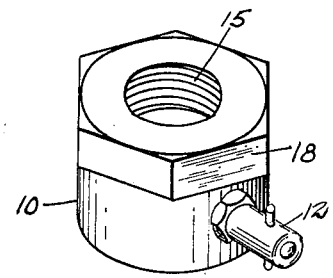
Figure 3:
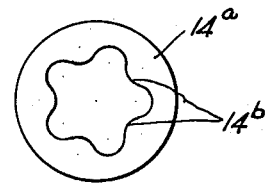

Fig. 1 is a longitudinal sectional elevation of a vehicle spring showing a center bolt adapted to serve as a means for distributing lubricant; Fig. 2 is an enlarged perspective view of the dome-shaped member through which the lubrication is introduced, and Fig. 3 is a plan view of the gasket employed under the dome-shaped member.

As is clearly shown in Fig. 1, a bolt 1 of the standard type, positioned centrally of an automobile leaf spring 2 and having a head 3, shank 4, and screw threaded end 5, upon which latter a nut 6 is adapted to engage, is provided at one end between the head of the bolt and the adjacent leaf 7 of the spring, with an annular gasket 8, and upon its other end between the nut 6 and the outer leaf 9 of the spring, with a dome-shaped member 10 provided upon one side thereof with a screw-threaded opening 11 into which is screwed a lubricating nipple or grease gun attachment 12, of any preferred type.

The dome-shaped member 10 as shown in Fig. 1 is provided upon its end faces with annular sealing gaskets 13, 14. In some instances such gaskets may be dispensed with as when the dome-shaped member itself is made of soft brass or similar metal.

In order to insure a free passageway at the base of the dome-shaped member, the latter is preferably provided with an extension edge 10$^a$ at its inner side around which the gasket 14 is positioned, as is shown in Fig. 1. However, the same result may be attained without using such extension edge by providing the gasket 14$^a$ with a scalloped inner edge 14$^b$ as is shown in Fig. 3.

Internally of the upper portion of said member, screw threads 15 are provided for engagement upon the screw threaded end of the bolt and the lower end 16 is enlarged into a chamber of sufficient diameter for the walls thereof to be spaced a considerable distance from the shank of the bolt thus providing therein a lubricating receptacle and distributing space 17. The dome-shaped member 10 may be of hexagonal cross section throughout all of its length or for the portion 18 thereof (as is shown in Fig. 2), so as to permit it to be engaged by a wrench and firmly seated against the outside surface of the adjacent leaf of the spring. The nut 6 of the bolt thus serves as a lock nut against the interposed gasket 13. It is common practice to pein the end of the bolt against the outer surface of the nut where a lock nut is not used.

From the above description the operation of the device has been indicated in part. Thus the nozzle of a grease gun is attached to the nipple 12 and pressure is applied to the grease in the cylinder of the gun in the usual manner. This causes grease to flow through the nozzle, forcing back the ball valve in the nipple 12, and then fill the chamber 17 in the dome-shaped member and thence flow downwardly along the outer surface of the bolt and into the spaces between adjacent pairs of spring leaves. The gasket seated against the inner face of the bolt head prevents the escape of grease at the lower end of the bolt.

It will be noted that all that is required to convert the standard form of fastening-bolt into a device for pressure lubrication are the several gaskets and the dome-shaped member carrying the nipple on one side. It may be that a longer bolt than that found in the spring may have to be used therefor but such bolts are always obtainable and the application of the accessory devices to the springs of an automobile is a simple and quickly performed operation. By reason of the large grease containing chamber in the dome-shaped member being in direct communication with the passageways between the spring leaves a sufficient body of grease to properly lubricate the spring may be maintained in a position to be effective. With devices wherein small apertures are formed upon the face or through the body of a bolt head or nut, the clogging of such passageways is almost certain to result and the device in consequence will be rendered inoperative.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:—

1. An apparatus of the character described, having in combination a leaf spring, a securing bolt extending therethrough, and having a screw-threaded end projecting therebeyond, a member open at its under side to provide a lubricating receptacle and distributing space, and having a screw-threaded aperture extending centrally completely through its upper portion, and engaged upon said screw-threaded end of said bolt to secure the same in position and a valved nipple seated in an opening formed in the side of said member through which lubricant may be introduced into said lubricating receptacle and distributing space and about said bolt.

2. A bolt securing and lubricating device comprising a member open at its under side to provide a lubricating receptacle and distributing space, and having a screw-threaded aperture extending centrally completely through its upper portion to permit the screw-threaded end of a standard bolt to project therethrough, said member having an opening at its side, and a valved nipple seated in said opening through which lubricant may be introduced into said lubricating receptacle and distributing space and about said bolt.

3. A bolt securing and lubricating device, comprising a member open at its under side to provide a lubricating receptacle and distributing space, and having a screw threaded aperture extending centrally completely through its upper portion to permit the screw-threaded end of a standard bolt to project therethrough, said member having an opening at its side, a valved nipple seated in said opening through which lubricant may be introduced into the interior of said member and about said bolt, and a polygonal exterior surface formed on said member to permit engagement by a wrench.

4. A bolt securing and lubricating device, comprising a member open at its under side to provide a lubricating receptacle and distributing space, and having a screw-threaded aperture extending centrally completely through its upper portion to permit the screw-threaded end of a standard bolt to project therethrough, said member having an opening at its side, a valved nipple seated in said opening through which lubricant may be introduced into the interior of said member and about said bolt, and means provided at the base of said member for centering a gasket adjacent thereto.

Signed by me this 17th day of July, 1925.

CHARLES P. MURPHY.